(12) United States Patent
Tanaka et al.

(10) Patent No.: US 7,300,296 B1
(45) Date of Patent: Nov. 27, 2007

(54) MEMORY CARD ADAPTOR

(75) Inventors: Akihiro Tanaka, Osaka (JP); Yasuo Nakai, Osaka (JP)

(73) Assignee: Hosiden Corporation, Yao-shi, Osaka (JP)

( * ) Notice: Subject to any disclaimer, the term of this patent is extended or adjusted under 35 U.S.C. 154(b) by 0 days.

(21) Appl. No.: 11/706,229

(22) Filed: Feb. 15, 2007

(30) Foreign Application Priority Data

Feb. 15, 2006 (JP) .............................. 2006-037365

(51) Int. Cl.
*H01R 13/62* (2006.01)
(52) U.S. Cl. ..................................................... 439/159
(58) Field of Classification Search ................ 439/159, 439/260, 267, 160, 630, 638, 945–946
See application file for complete search history.

(56) References Cited

U.S. PATENT DOCUMENTS 7,037,125 B1 * 5/2006 Kuan et al. .................. 439/159
7,044,797 B1 * 5/2006 Lai ............................. 439/630
7,052,286 B2 * 5/2006 Zhang .......................... 439/74
2004/0166713 A1 * 8/2004 Lai ............................. 439/159
2006/0014434 A1 1/2006 Yamamoto

FOREIGN PATENT DOCUMENTS

| DE | 20 2005 001 504 U1 | 5/2005 |
| EP | 1 553 519 A1 | 7/2005 |
| JP | 2005-243277 A | 9/2005 |

* cited by examiner

*Primary Examiner*—J. F. Duverne
(74) *Attorney, Agent, or Firm*—Bacon & Thomas, PLLC

(57) ABSTRACT

The present invention relates to a memory card adaptor which enables a small memory card to be used in a card connector for a large memory card that is larger than the small memory card. Even a contact spring piece portion of the different shape can maintain stable contact with a terminal 303a of a micro SD card.

2 Claims, 12 Drawing Sheets

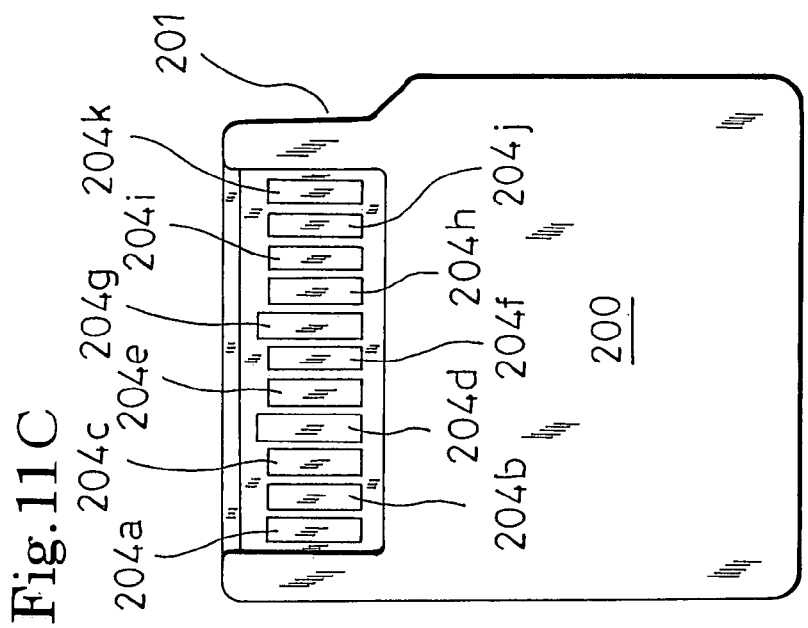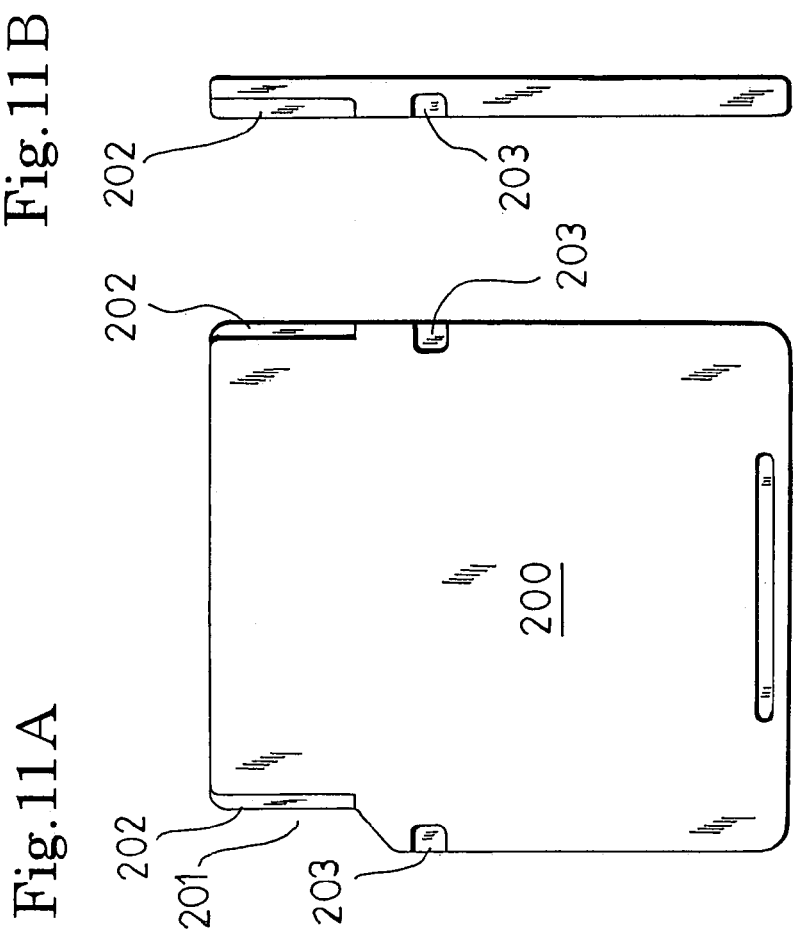

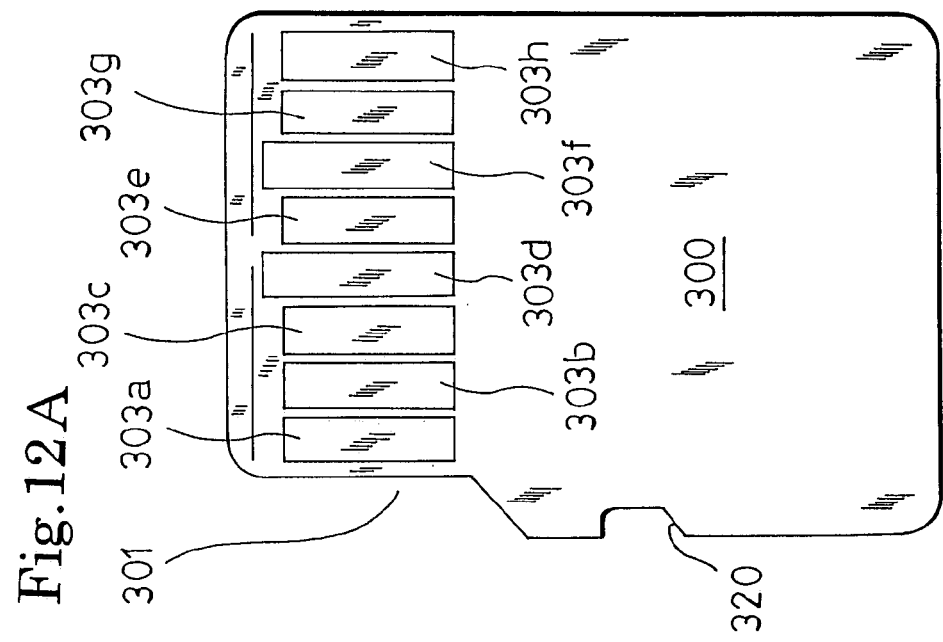
Fig.12A
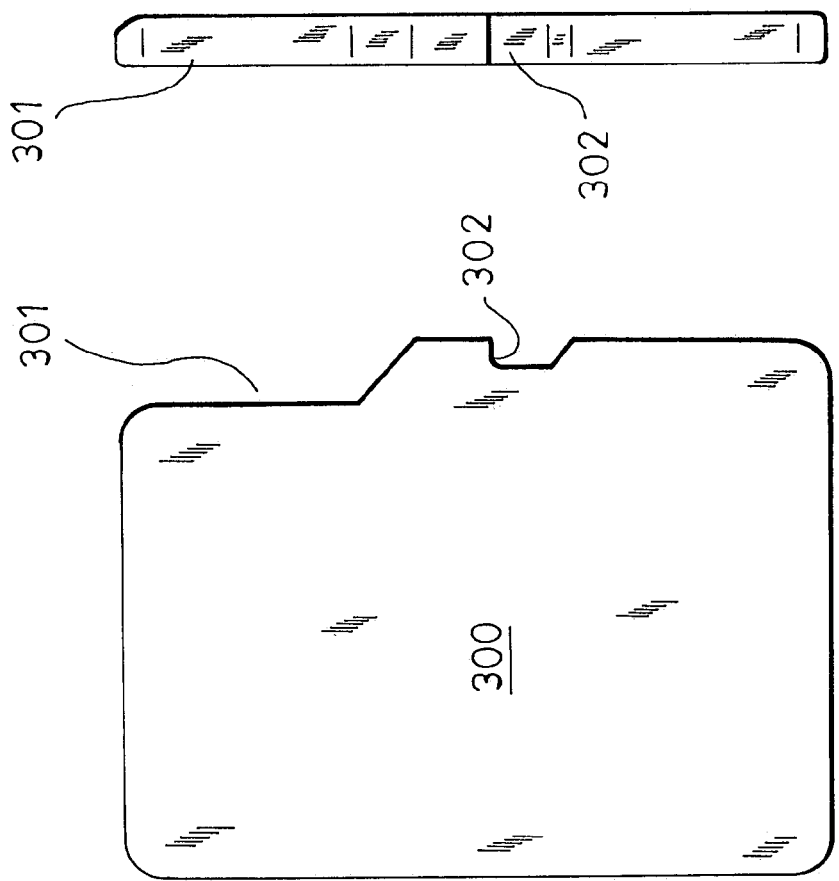
Fig.12B
Fig.12C

MEMORY CARD ADAPTOR

BACKGROUND OF THE INVENTION

1. Field of the Invention

The present invention relates to a memory card adaptor which enables a small memory card to be used in a card connector for a large memory card that is larger than the small memory card.

2. Description of the Prior Art

Conventionally, as disclosed in Japanese Patent Application Laying-Open No. 2005-243277, a memory card adaptor comprising: a adaptor body having outer dimensions which are identical with those of a large memory card that is larger than a small memory card; and an electrical connection part between a small memory card and a card connector for a large memory card is known. In the adaptor body, upper and lower case members are fitted to each other, a card insertion port into which a small memory card is to be inserted is disposed in a front side face, and a card attaching portion which communicates with the card insertion port, and to which a small memory card is to be attached is disposed in an inner front portion. The electrical connection part is a composite part configured by an insulative member and plural conductive members, and formed by insert molding. The insulative member is housed in an inner rear portion of the adaptor body. In each of the conductive members, a cantilevered front end portion that is protruded from the insulative member into the card attaching portion forms a contact spring piece portion which is to be elastically contacted with a terminal of a small memory card attached to the card attaching portion, and a rear end portion which is exposed from the rear face side of a rear end portion of the adaptor body forms a contact piece portion which is to be elastically contacted with a terminal of the card connector for a large memory card.

The electrical connection part is produced in the following manner. Plural conductive members are formed in a state where the members are integrally coupled to a hoop material. The plural conductive members in the state where they are integrally coupled are insert-molded, thereby forming an insulative member. Thereafter, unwanted coupling portions of the plural conductive members in the state where they are integrally coupled are cut off through tool insertion holes which are disposed on the insulative member in the molding process in portions corresponding to the coupling portions. Finally, the electrical connection part is separated from the hoop material.

SUMMARY OF THE INVENTION

In accordance with kinds of memory card adaptors, arrangement states of contact spring piece portions and contact piece portions of conductive members, and shapes of insulative members are different. Depending on arrangement states of contact spring piece portions and contact piece portions of conductive members, and shapes of insulative members, there is a case where a front end part of the conductive members fails to be protruded from the insulative member into the card attaching portion of the adaptor body in a straight manner in a plan view, and are protruded in an L-like shape in a plan view. When a force is applied on a contact spring piece portion of a different shape (L-like shape) formed by one end portion of the conductive member which is protruded in an L-like shape from the insulative member into the card attaching portion of the adaptor body, stress is applied concentrically on a root part, and a force acts in a direction along which the root part is twisted. Unlike the other contact spring piece portions (contact spring piece portions formed by one-end portions of the conductive members which are protruded from the insulative member into the card attaching portion of the adaptor body in a straight manner in a plan view), therefore, the root part of the contact spring piece portion of the different shape is subjected to a very large load. Accordingly, there is the possibility that the root part of the contact spring piece portion of the different shape which is joined to the conductive member by the thickness thereof is separated off (peeled off) from the conductive member. When the strength reduction occurs only in the contact spring piece portion of the different shape, the spring force is reduced. As a result, the contact spring piece portion produces a spring force which is different from (smaller than) spring forces of the other contact spring piece portions, and it is difficult to maintain stable contact (electrical connection) with a small memory card attached to the adaptor body.

The invention has been conducted in view of the problem. It is an object of the invention to provide a memory card adaptor in which even a contact spring piece portion of a different shape can maintain stable contact with a small memory card.

In order to attain the object, the invention provides a memory card adaptor comprising: an adaptor body which is configured by a base, and a cover covering the base, and in which a card insertion port into which a small memory card is to be inserted is disposed in a front side face, a card attaching portion which communicates with the card insertion port, and to which a small memory card is to be attached is disposed in an inner front portion, and outer dimensions thereof are identical with outer dimensions of a large memory card that is larger than the small memory card; and an electrical connection part between the small memory card and a card connector for the large memory card, the electrical connection part being a composite part configured by an insulative member and plural conductive members, and formed by insert molding, the insulative member being housed in an inner rear portion of the adaptor body, cantilevered front end portions of the conductive members being protruded from the insulative member into the card attaching portion, and forming contact spring piece portions which are to be elastically contacted with terminals of the small memory card attached to the card attaching portion, rear end portions of the conductive members being exposed from a rear face side of a rear end portion of the adaptor body, and forming contact piece portions with which terminals of the card connector for the large memory card are to be elastically contacted, at least one of the contact spring piece portions being formed into a different shape not by a front end portion of a conductive member protruded from the insulative member into the card attaching portion of the adaptor body in a straight manner in a plan view, but by a front end portion of a conductive member protruded in an L-like shape, wherein the memory card adaptor further comprises a resin-made pressing member which interposes a root part of the contact spring piece portion of the different shape between the pressing member and the adaptor body. Since the contact spring piece portion of the different shape is caused by the pressing member to be interposed between the pressing member and the adaptor body, a force acting in a direction along which the root part is twisted is not produced, and the strength and spring force of the contact spring piece portion are substantially identical with those of the other the contact spring piece portions. Therefore, even a contact spring piece portion of a different shape can maintain stable contact with a small memory card.

In the invention, preferably, a plug portion which is fitted into a tool insertion hole is disposed integrally in the pressing member, the tool insertion hole being formed in the insulative member when insert molding is performed on the insulative member and the plural conductive members in a state where the conductive members are integrally coupled to a hoop material, and being used for, after the insert molding, cutting off unwanted coupling portions of plural conductive members in an integrally coupled state. When the plug portion which is to be fitted into the tool insertion hole of the insulative member that is formed for cutting off the unwanted coupling portions is disposed integrally in the pressing member as described above, the pressing member can be surely fixed to the interior of the adaptor body by using the tool insertion hole, so that the pressing function of the pressing member can be sufficiently exerted. Moreover, the tool insertion hole can be closed by the plug portion of the pressing member. Therefore, it is possible to prevent conductive foreign materials such as dusts which may cause short circuit, from entering the tool insertion hole.

BRIEF DESCRIPTION OF THE DRAWINGS

FIG. 11A is a front face view of a mini SD card, FIG. 11B is a side view of the mini SD card, and FIG. 11C is a rear face view of the mini SD card; and FIG. 12A is a front face view of a micro SD card, FIG. 12B is a side view of the micro SD card, and FIG. 12C is a rear face view of the micro SD card.

DETAILED DESCRIPTION OF THE PREFERRED EMBODIMENT

Figure 1:
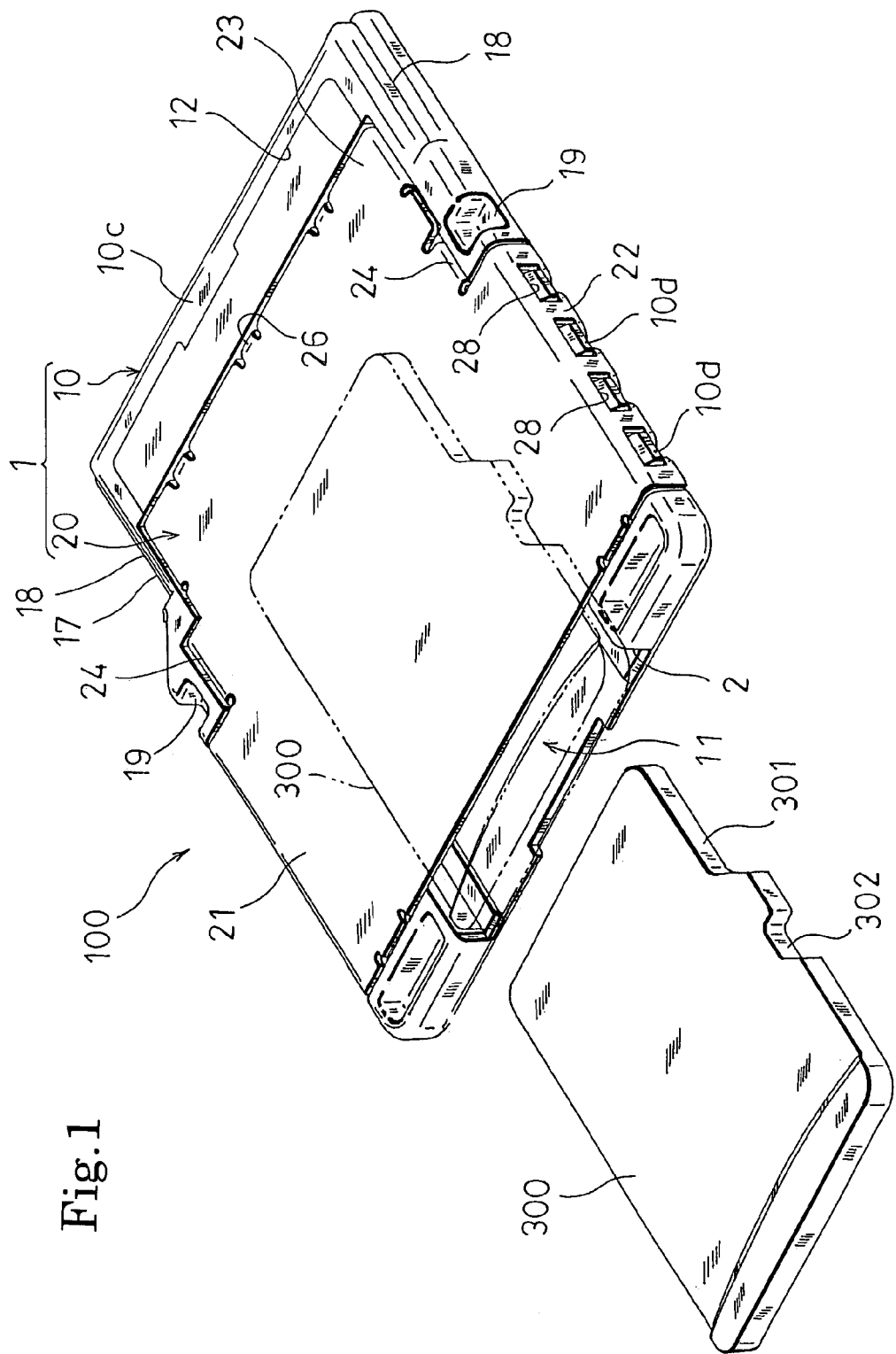
FIG. 1 is an external view of a memory card adaptor of an embodiment, as viewed from the front face side.

Hereinafter, an embodiment of the memory card adaptor of the invention will be described with reference to FIGS. 1 to 10. A memory card adaptor 100 of the embodiment is used so that a micro SD card 300 which is shown in FIGS. 1, 2, and 12, and which is a small memory card is attached to the adaptor, and the micro SD card is enabled to be used in a card connector (not shown) for a mini SD card 200 which is shown in FIG. 11, and which is a card connector for a larger memory card.

In a mini SD card (20×21.5×1.4 mm: length×width×thickness) 200 which is conventionally provided as a downsized version of an SD card (24×32×2.1 mm: length×width×thickness), as shown FIG. 11, eleven terminals 204a to 204k are juxtaposed in a direction (hereinafter, referred to as "lateral direction") which is perpendicular to the longitudinal direction and the thickness direction, in the rear face side of an end portion of the front side in the case where the mini SD card is inserted in the normal insertion posture (hereinafter, the front side in this case is referred to as "rear side"). In the rear side, a cutaway portion 201 is formed by cutting away one edge. A step portion 202 which is upward directed is formed in each of the right and left side edges of the surface side of the rear end portion of the mini SD card 200 in which the width is narrowed by the cut-away portion 201. The cut-away portion 201 cooperates with the step portions 202 to prevent erroneous insertion into the card connector in a posture other than the normal insertion posture (insertion in a posture where the front and rear relationship and the front and back relationship are inverted) from occurring. A locking cut-away 203 is disposed in each of the right and left sides of the surface in a wider portion which is in front of the step portions 202, so that, when the mini SD card is attached to the card connector, locking members of the card connector are engaged with the locking cut-aways 203, thereby preventing the mini SD card from dropping off. In the eleven terminals 204a to 204k of the mini SD card 200, the first to eleventh terminals 204a to 204k are sequentially arranged in a direction from the side opposite to the cut-away portion 201 toward the cut-away portion 201, four or the first, second, tenth, and eleventh terminals 204a, 204b, 204j, 204k are used for data, the third terminal 204c is used for a command, two or the fourth and ninth terminals 204d, 2041 are used for grounding, the seventh terminal 204g is used for power supply, and the eighth terminal 204h is used for a clock signal. The two or the fifth and sixth terminals 204e, 204f are preliminarily added to the mini SD card 200. The effective terminals are nine so as to correspond to the nine terminals of the SD card.

Figure 2:
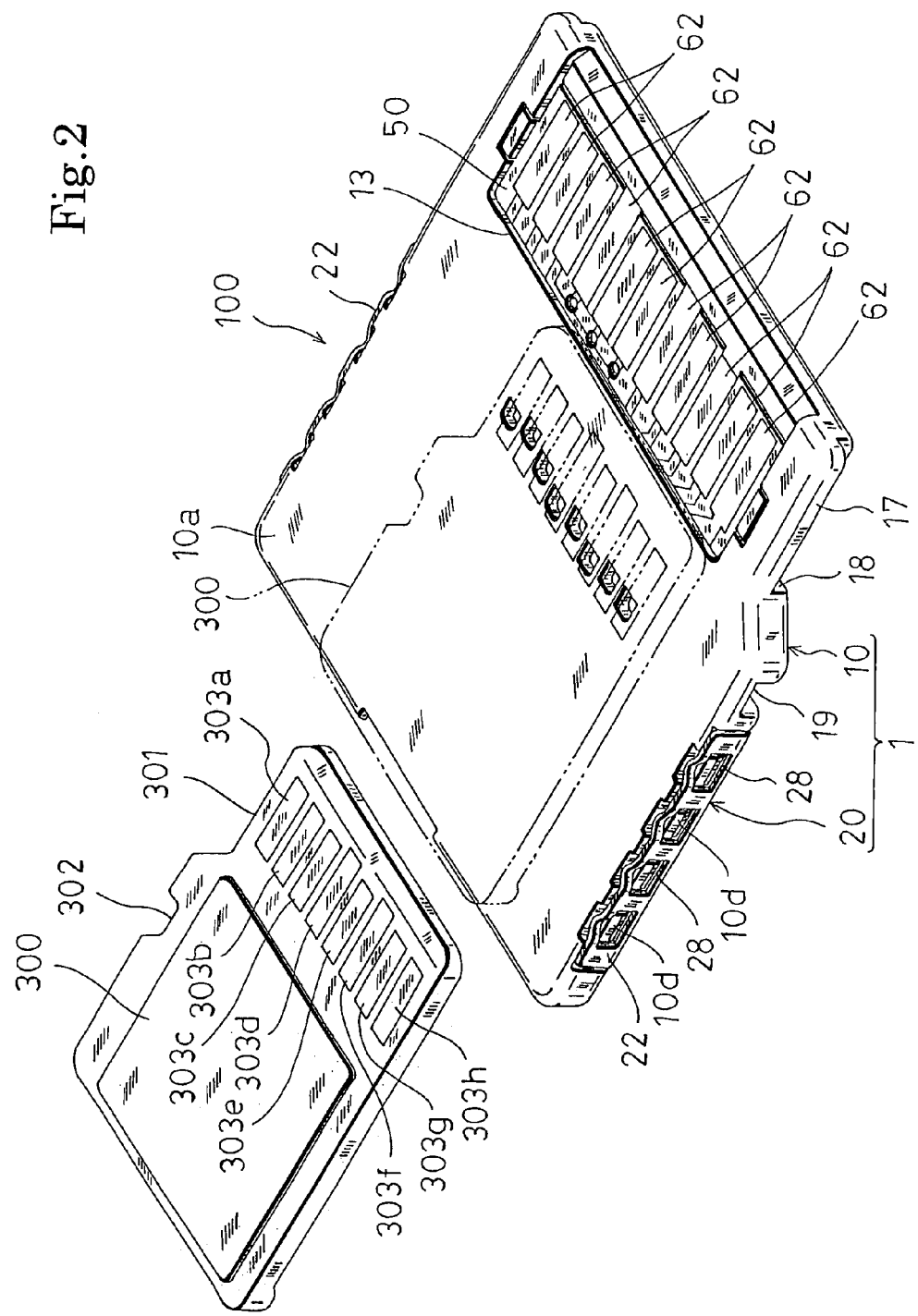
FIG. 2 is an external view of the adaptor of the embodiment, as viewed from the rear face side.

As shown in FIGS. 1, 2, and 12, a TransFlash card which is conventionally provided as a memory card which is smaller than the mini SD card 200, and a micro SD card (11×15×1 mm: length×width×thickness) 300 in which the TransFlash specification is applied are provided with a cut-away portion 301 which is formed by cutting away one edge. A locking cut-away 302 is disposed in one side portion on the side of the cut-away portion 301 and in a wider portion which is in front of the cut-away portion 301. In the rear face side of an end portion of the rear side, eight terminals 303a to 303h are juxtaposed in the lateral direction. In the eight terminals 303a to 303h of the micro SD card 300, the first to eighth terminals 303a to 303h are sequentially arranged in a direction from the cut-away portion 301 toward the opposite side thereof, four or the first, second, seventh, and eighth terminals 303a, 303b, 303g, 303h are used for data, the third terminal 303c is used for a command, the fourth terminal 303d is used for power supply, the fifth terminal 303e is used for a clock signal, and the sixth terminal 303f is used for grounding. In the micro SD card 300, namely, the grounding terminal is reduced to one, and the number of terminals is reduced to eight as compared with the case where an SD card and the mini SD card 200 have the nine terminals (in the mini SD card 200, the number of effective terminals).

Figure 3:
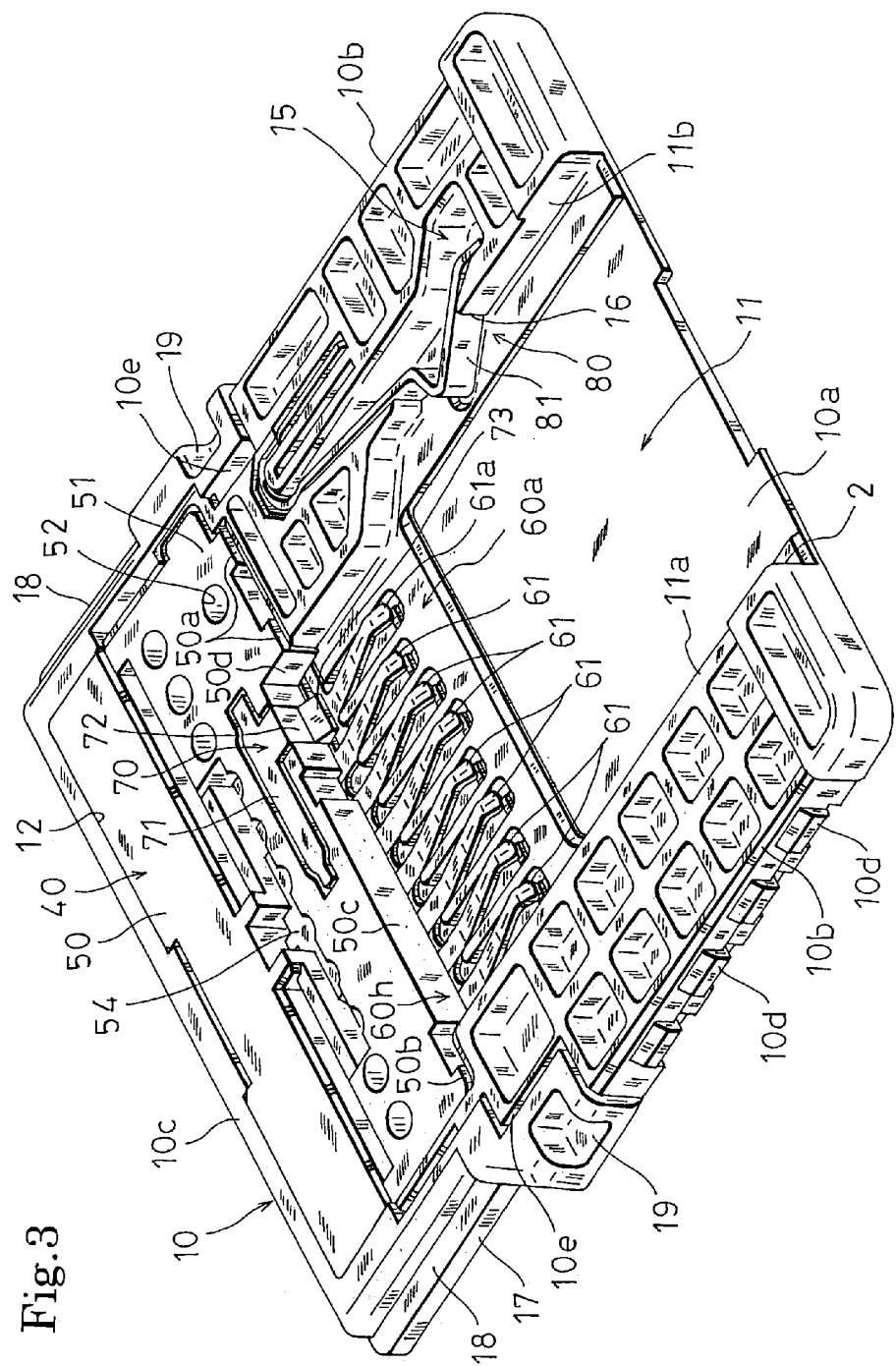
FIG. 3 is an external view of the memory card adaptor of the embodiment in a state where a cover is detached for showing the internal structure, as viewed from the front face side.
Figure 5:
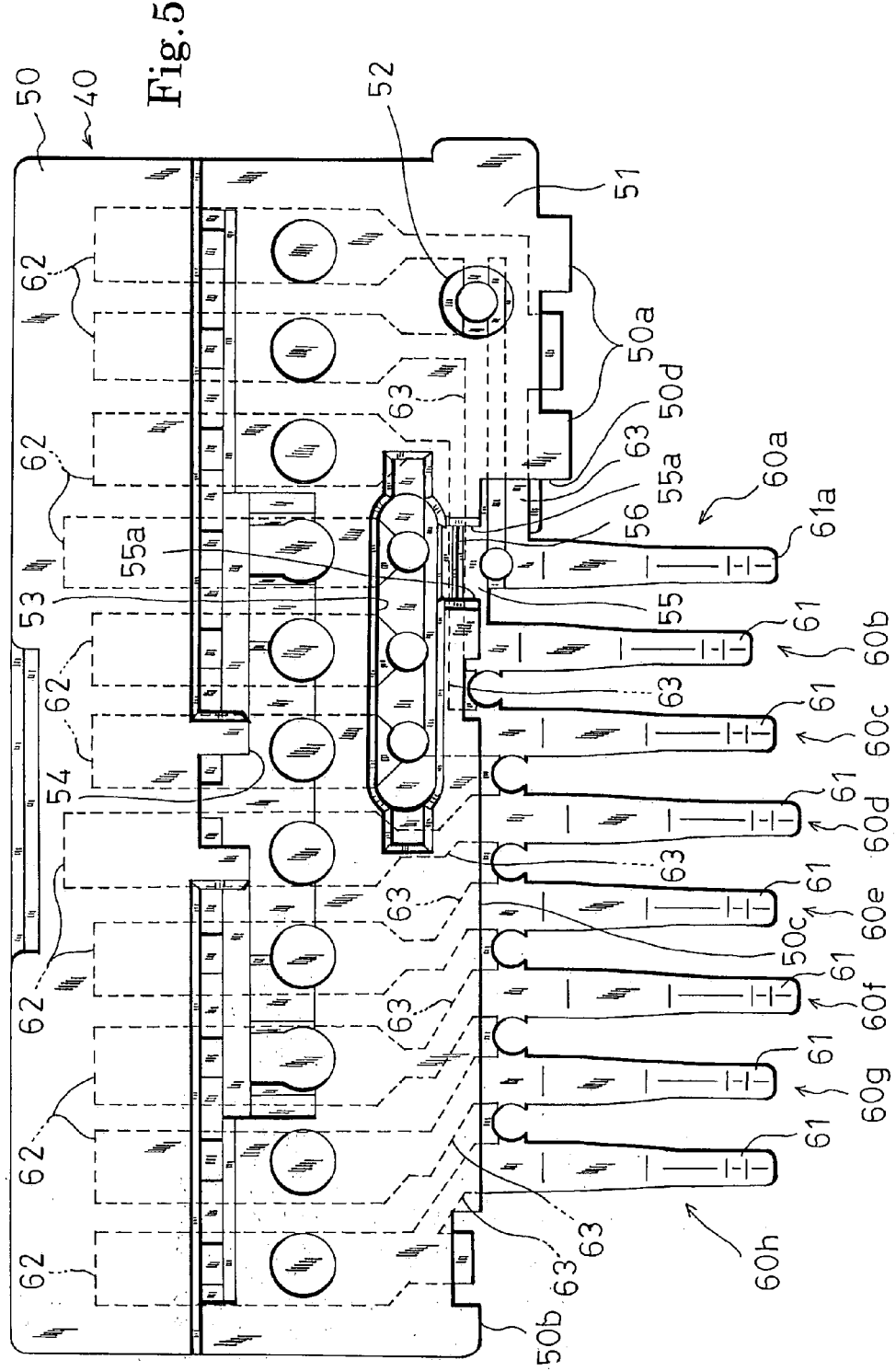
FIG. 5 is a plan view of an electrical connection part.
Figure 6:
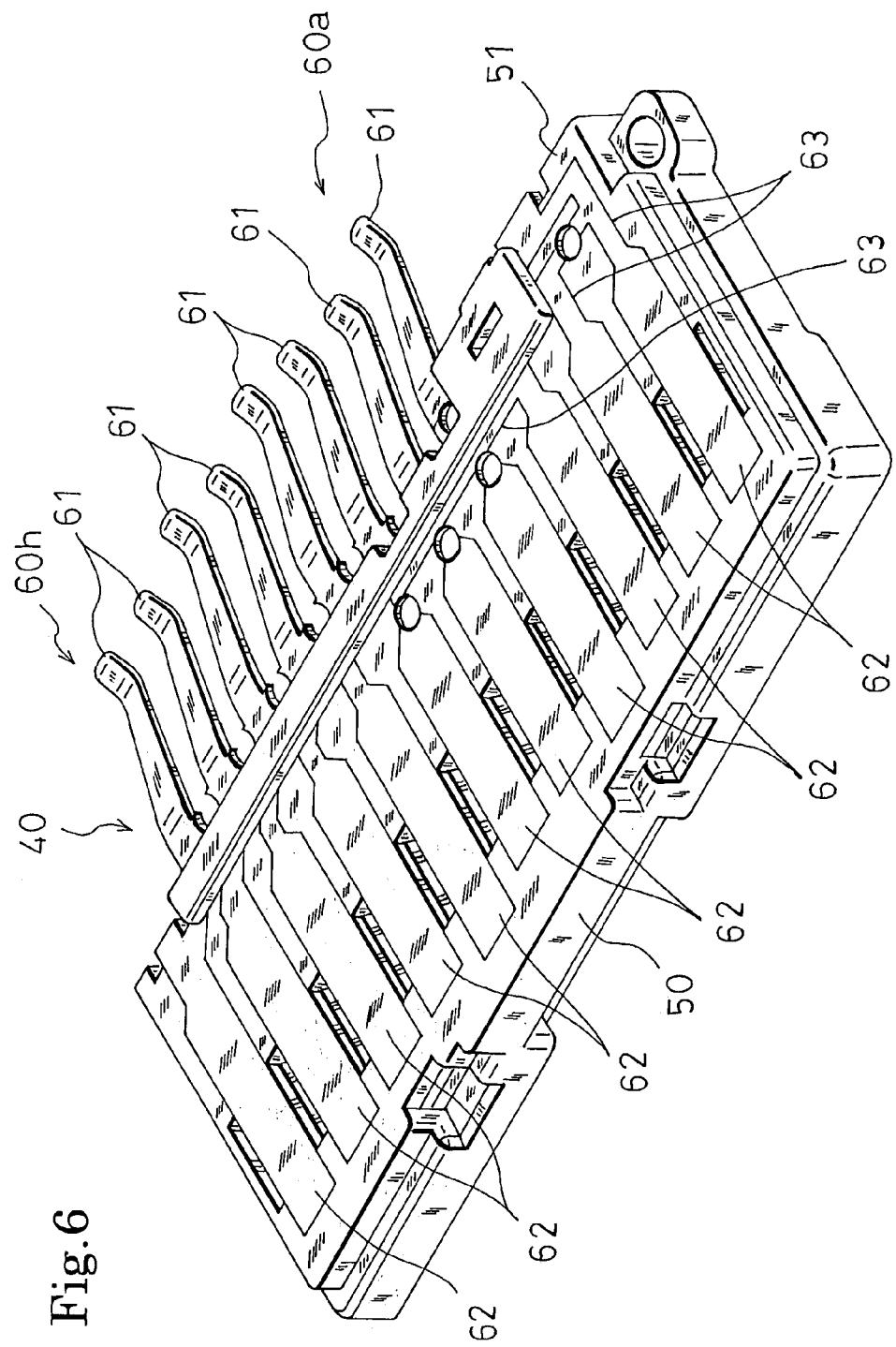
FIG. 6 is an external view of the electrical connection part, as viewed from the rear face side.
Figure 9:
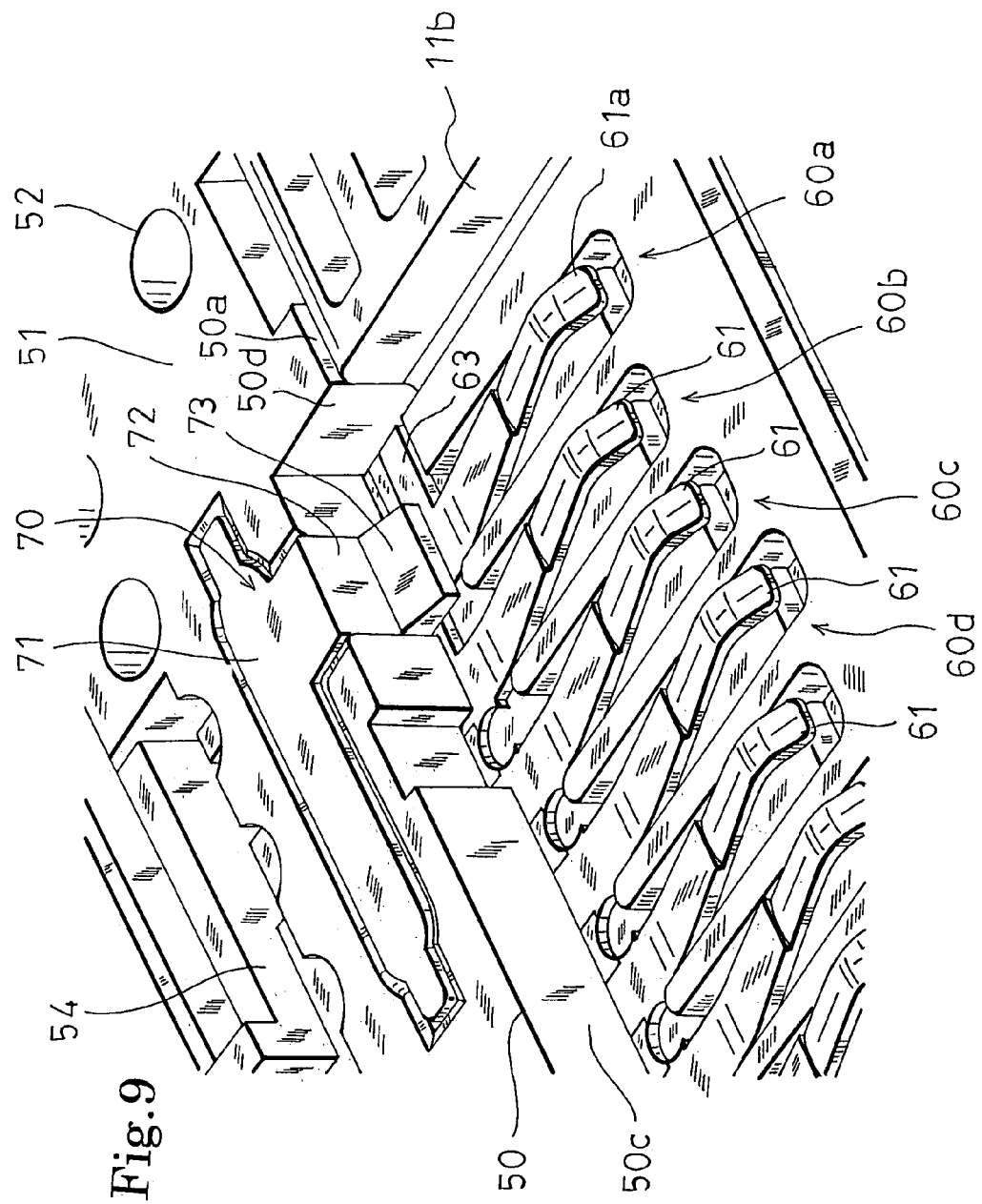
FIG. 9 is a view showing the contact spring piece portion of a different shape, whose root portion is pressed by the pressing member.
Figure 10:
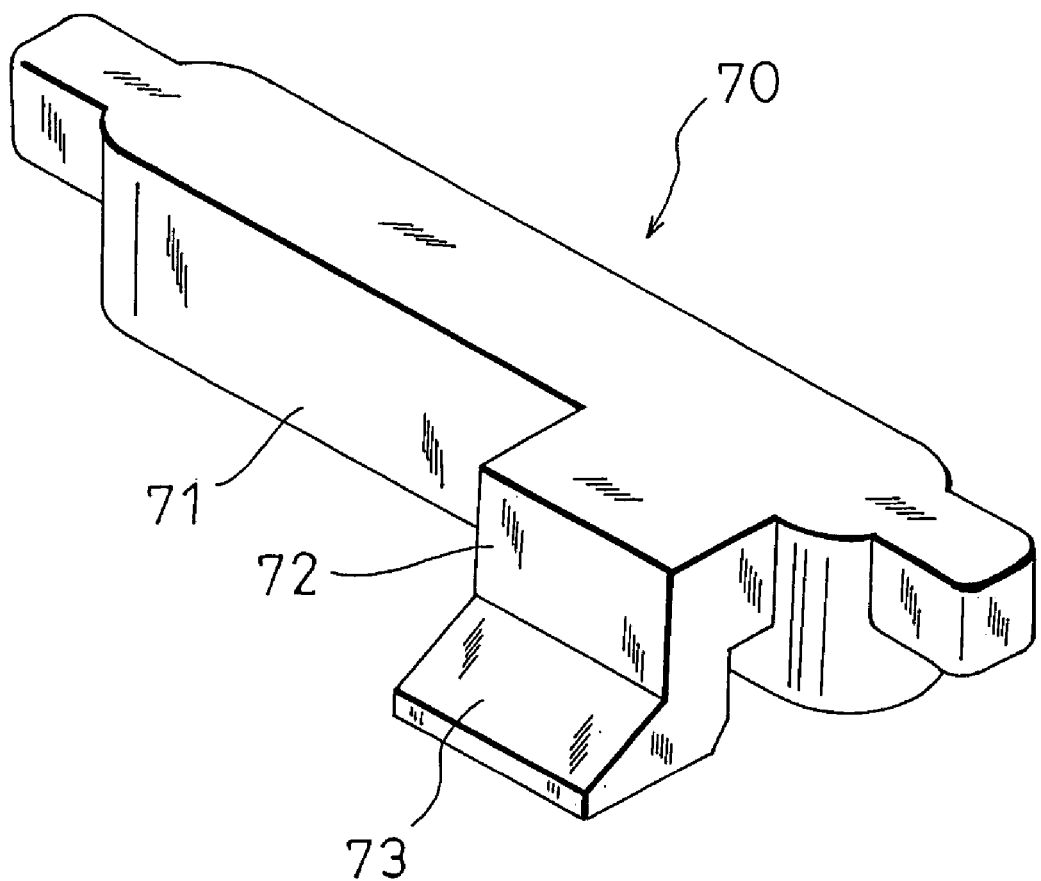
FIG. 10 is an external view of the pressing member.

The memory card adaptor 100 of the embodiment is configured by: a mini SD card type adaptor body 1 which is shown in FIGS. 1 and 2, which is formed into outer dimensions (the dimensions of the length, the width, and the thickness) that are identical with those of the mini SD card 200, in order to cope with the mini SD card specification, and to which the micro SD card 300 is to be attached; an electrical connection part 40 which is housed in the adaptor body 1, and which is shown in FIGS. 3, 5, and 6; a pressing member 70 which is shown in FIGS. 3, 9, and 10; and a locking member 80 which is shown in FIG. 3.

As shown in FIGS. 1 and 2, the adaptor body 1 is configured by a resin-made (insulative) base 10, and a meta-made (conductive) cover 20 which is formed by a metal plate.

In the base 10, as shown in FIGS. 1, 2, and 3, a bottom plate 10*a* which is substantially rectangular, and in which one rear edge is cut away, reinforcing ribs 10*b* which upstand lengthwise and widthwise in right and left side areas of the front wide portion of the bottom plate 10*a* in which the width is not narrowed by the cut-away portion, and a side wall 10*c* which upstands along the peripheral edge of the rear side of the bottom plate 10*a* in which the width is narrowed by the cut-away portion are integrally formed. A card attaching portion 11 which is to house the micro SD card 300 is formed between the right and left reinforcing ribs 10*b*, and an insulator housing portion 12 for the electrical connection part 40 is formed continuously with the rear side of the card attaching portion 11. A large contact exposing window 13 is opened in the bottom face of the insulator housing portion 12. A locking member housing portion 15 is formed in adjacent to one side (right side) of the card attaching portion 11 to communicate with the card attaching portion 11 through a communication port 16.

In the base 10, disposed are a cut-away portion 17, step portions 18, and locking cut-aways 19 for the adaptor which correspond to the cut-away portion 201, step portions 202, and locking cut-aways 203 of the mini SD card 200, respectively. Plural cover engagement hooks 10*d* are disposed on the right and left outer side faces of the wide portion of the base 10, and cover engagement grooves 10*e* are disposed in right and left inner side portions of the wide portion of the base 10.

The longitudinal lengths of the right and left reinforcing ribs 10*b* which form the right and left side faces 11*a*, 11*b* of the card attaching portion 11 are made different from each other so that, between the right and left side faces 11*a*, 11*b* of the card attaching portion 11, a rear end portion of one (right) side face 11*b* is positionally shifted in the forward direction (toward the card insertion port) with respect to a rear end portion of the other (left) side face 11*a*.

Figure 4:
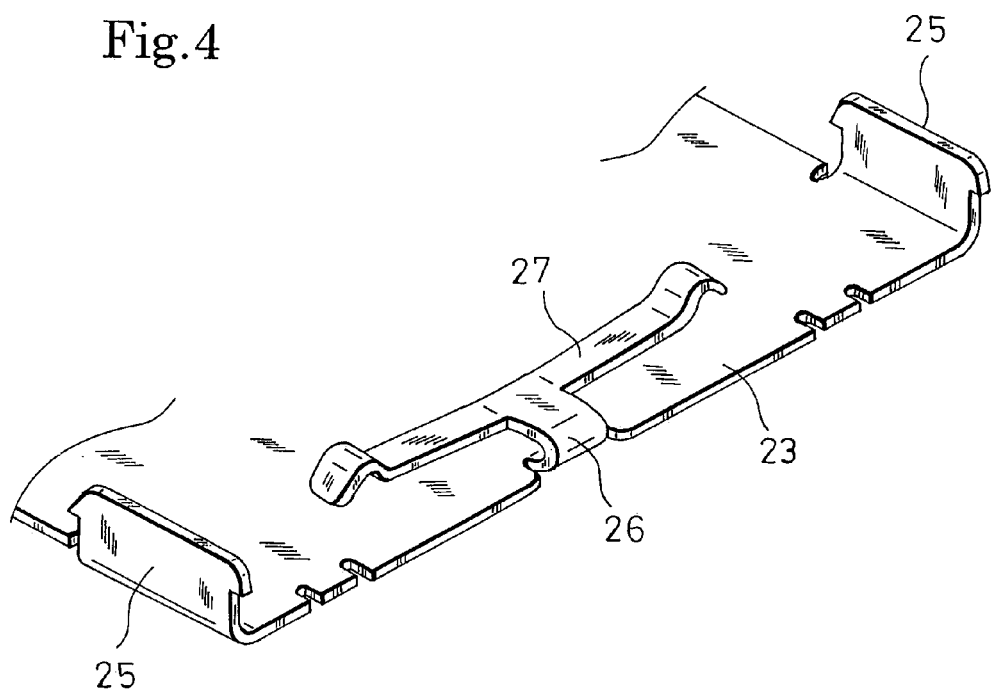
FIG. 4 is a view showing a connecting terminal of the cover.

In the cover 20, as shown in FIGS. 1, 2, and 4, integrally formed are: a rectangular plate-like main portion 21 which covers the upper face of the front wide portion of the base 10; first elongated portions 22 which hang from the right and left side edges of the main portion 21 to cover the right and left outer side faces of the front wide portion of the base 10; a second elongated portion 23 which is rearward elongated flushly from the rear edge of the main portion 21 to cover the upper face of the insulator housing portion 12 of the base 10, and which is narrower than the main portion 21; first engagement hooks 24 which are downward elongated from the right and left side edges of a basal part of the second elongated portion 23; second engagement hooks 25 which are downward elongated from the right and left side portions of the tip end side edge of the second elongated portion 23; a folded piece 26 which is elongated in a U-like shape from a substantially middle portion of the tip end side edge of the second elongated portion 23, and in which an end portion thereof is opposed to the inner face of the second elongated portion 23; and a connecting terminal 27 which is elastically displaceable, and which is a plate spring that is elongated in the lateral direction (the juxtaposition direction of the contacts) on the side of the inner face of the second elongated portion 23 while an intermediate portion is continuous to the end portion of the folded piece 26. Plural base engagement holes 28 serving also as lower holes for caulking are disposed in the first elongated portions 22.

As shown in FIGS. 3, 5, and 6, the electrical connection part 40 is a composite part which is formed by insert molding, and which is configured by an insulator 50 serving as an insulative member, and plural (eight in the case of the micro SD card 300) contacts 60*a* to 60*h* serving as conductive members.

Figure 7:
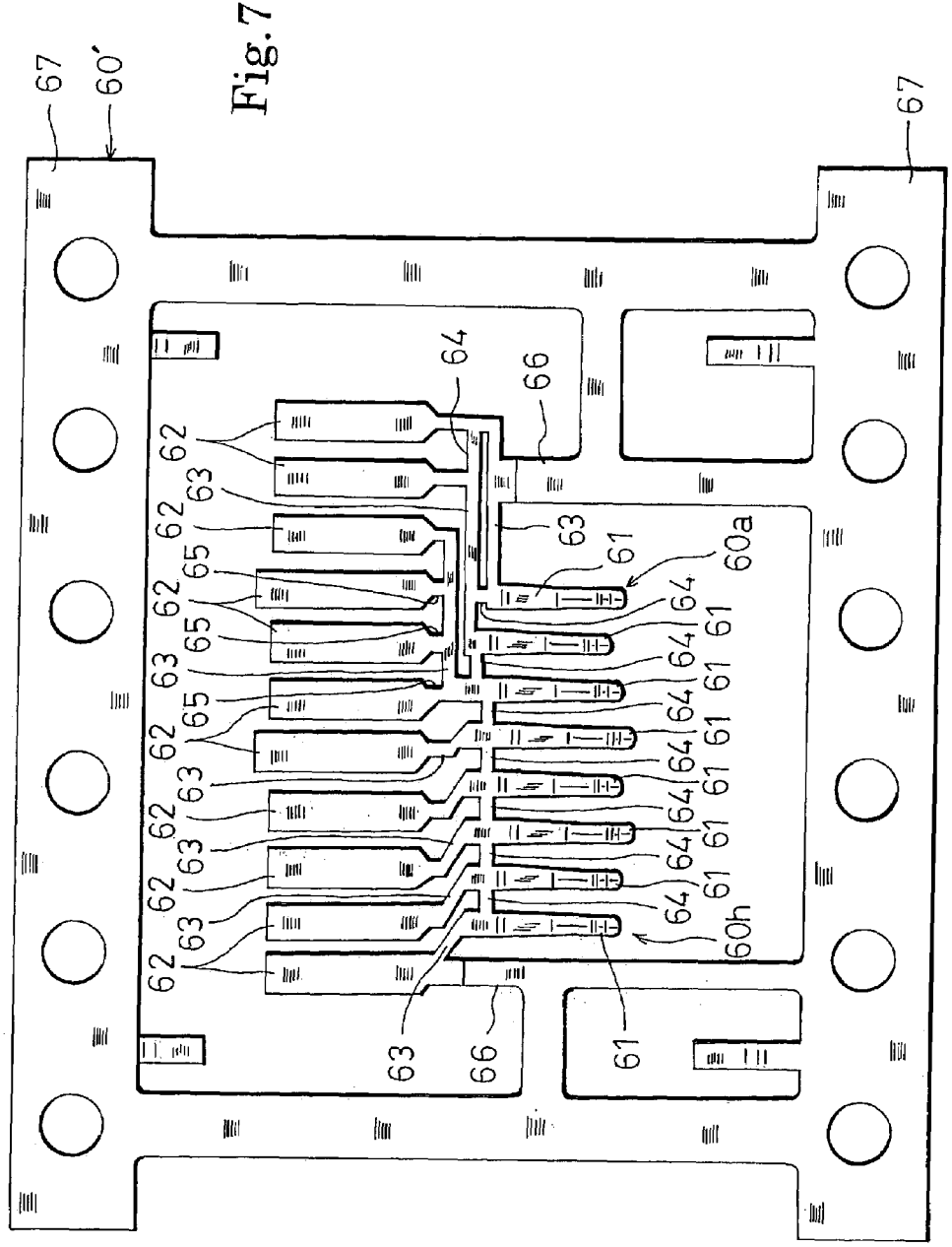
FIG. 7 is a plan view of plural contacts which are formed in a state where the contacts are integrally coupled to a hoop material.

As shown in FIG. 7, the eight contacts 60*a* to 60*h* are formed in a state where the contacts are integrally coupled to each other by applying punching and bending processes on a metal hoop material 60'.

Each of the contacts 60*a* to 60*h* is configured by integrally forming: a narrow contact spring piece portion 61 which is formed in a front end portion, which is forward protruded, and which has an L-like section shape; a rectangular plate-like contact piece portion 62 which is formed in a rear end portion; and a connecting piece 63 which integrally connects the contact spring piece portion 61 in the front end portion with the contact piece portion 62 in the rear end portion. Adjacent ones of the contacts 60*a* to 60*h* are coupled together while maintaining predetermined intervals through first joining pieces 64, whereby the contacts 60*a* to 60*h* are arranged in a laterally juxtaposed state so that the contact spring piece portions 61 are arranged in the front end portions of the contacts 60*a* to 60*h* in a laterally juxtaposed state, and the contact piece portions 62 are arranged in the rear end portions of the contacts 60*a* to 60*h* in a laterally juxtaposed state. The first to eighth contacts 60*a* to 60*h* are sequentially arranged from right to left in the plane of FIGS. 5 and 7, four or the first, second, seventh, and eighth contacts 60*a*, 60*b*, 60*g*, 60*h* are used for data, the third contact 60*c* is used for a command, the fourth contact 60*d* is used for power supply, the fifth contact 60*e* is used for a clock signal, and the sixth terminal 60*f* is used for grounding, in the same manner as the eight terminals 303*a* to 303*h* of the micro SD card 300.

The micro SD card 300 has the eight contacts in contrast to the eleven terminals of the mini SD card 200. Therefore, one grounding contact piece portion 62, and two reserve contact piece portions 62, or three contact piece portions 62 in total are interposed between the contact piece portion 62 of the third contact 60*c* for a command, and the contact piece portion 62 of the fourth contact for power supply, so as to attain the same arrangement of the eleven terminals 204*a* to 204*k* of the mini SD card 200. The three contact piece portions 62 in total, or the one grounding contact piece portion 62 and the two reserve contact piece portions 62 are coupled integrally to the connecting piece 63 of the third contact 60*c* for a command through second joining pieces 65. Therefore, the first to third contacts 60*a*, 60*b*, 60*c* are in an arrangement state in which the contact piece portions 62 are largely positionally shifted toward the lateral outer side (in the rightward direction in FIGS. 5 and 7) with respect to the contact spring piece portions 61, and formed into a crank-like bent shape. In the first contact 60*a* which is positioned at the endmost, accordingly, an end portion of the connecting piece 63 on the side of the contact spring piece portion 61 extends in the lateral direction which is perpendicular to the contact spring piece portion 61, and, in front of rear end portions of the contact spring piece portions 61 of the other seven or second to eighth contacts 60b to 60h, extends in the lateral direction which is perpendicular to the contact spring piece portion 61. Therefore, the rear end portion of the first contact 60a which is positioned at the endmost is positionally shifted toward the front side with respect to the rear end portions of the contact spring piece portions 61 of the other seven or second to eighth contacts 60b to 60h.

The eight contacts 60a to 60h which are integrally coupled together in the above-described arrangement state are coupled at the contacts 60a, 60h at the both ends to a carrier 67 through right and left connecting pieces 66, and formed so that they can be supplied to a molding machine. When insert molding is performed by a molding machine, the insulator 50 is formed.

In the insulator 50, as shown in FIGS. 3, 5, and 6, the connecting pieces 63 which are in rear of the root parts of the contact spring piece portions 61 of the eight integrally coupled contacts 60a to 60h, and the contact piece portions 62 are integrally surrounded by a resin. The insulator is formed into a rectangular parallelepiped shape which laterally elongates, to be allowed to enter the insulator housing portion 12 of the base 10. As a result, the connecting pieces 63 and the contact piece portions 62 are joined by dimensions corresponding to their thicknesses to the rear face (lower face) of the insulator 50, the contact piece portions 62 are flushly held (fixed) to the rear face of the insulator 50 in a laterally juxtaposed state, the tip end portions in front of the root parts of the contact spring piece portions 61 of the eight integrally coupled contact spring pieces 60a to 60h are inclinedly protruded in a forward upward sloping manner in the front side of the insulator 50.

The front side face of the insulator 50 is formed into a step-like shape so that the front side face which is outside the contact spring piece portion 61 of the first contact 60a is partly forward protruded, and integrated with the connecting piece 63 on the side of the contact spring piece portion 61 of the first contact 60a by a protrusion 51 in one front side of the insulator 50. The front side face of the protrusion 51 of the insulator 50 forms a joining face 51a which is to butt against the rear side face of the longitudinally shorter reinforcing rib 10b of the card attaching portion 11. The front side face of the insulator 50 other than the protrusion 51 forms a joining face 51b which is to butt against the rear side face of the longitudinally longer reinforcing rib 10b of the card attaching portion 11, and an inner rear end wall 50c of the card attaching portion 11. A step face formed by the front side face of the protrusion 51 of the insulator 50, and that of the insulator 50 other than the protrusion 51 forms a partial side face 50d of the card attaching portion 11 which is flushly continuous to a rear end of the side face 11b of the longitudinally shorter side (right side) of the card attaching portion 11, and which aligns the rear end (length) of the side face 11b with the rear end (length) of the side face 11a of the longitudinally longer side (left side). The rear end wall 50c of the card attaching portion 11, and a rear end portion of the one side face 11b are formed by the insulator 50.

An end portion of the connecting piece 63 which is on the side of the contact spring piece portion 61 of the first contact 60a is protruded into the card attaching portion 11 from the partial side face 50d of the card attaching portion 11 which is formed by the insulator 50, whereby the contact spring piece portion 61 of the first contact 60a is juxtaposed with the spring piece portions 61 of the seven or second to eighth contacts 60b to 60h which are forward protruded from the inner rear end wall 50c of the card attaching portion 11 which is formed by the insulator 50, into the card attaching portion 11 in a straight manner in a plan view. In accordance with this configuration, at least one of the plural (eight) contact spring piece portions 61, i.e., in the embodiment, the contact spring piece portion 61 of the first contact 60a is formed into a different shape not by the front end portions of the contacts protruded from the insulator 50 into the card attaching portion 11 in a straight manner in a plan view, but by the front end portion of the contact 60a protruded in an L-like shape.

In the insulator 50, a circular tool insertion hole 52, an elliptic tool insertion hole 53, and a terminal housing hole 54 are disposed. One of the plural joining pieces 64 disposed in the region of the insulator 50, or the first joining piece 64 through which the end portion of the first contact 60a disposed in the region of the insulator 50 is coupled with that of the connecting piece 63 on the side of the contact piece portion 62 of the second contact 60b must be cut off after insert molding. For this purpose, the tool insertion hole 52 is formed on the first joining piece 64. The three second joining pieces 65 through which the one grounding connecting piece 63 and the two reserve connecting pieces 63 are coupled to the connecting piece 63 of the third contact 60c must be collectively cut off after insert molding. For this purpose, the tool insertion hole 53 is formed on the three second joining pieces 65. The terminal housing hole 54 is disposed over the two grounding connecting pieces 63 in order that the folded piece 26 and connecting terminal 27 disposed on the cover 20 are housed, and that the one end of the connecting terminal 27 is contacted from the upper side with the one grounding connecting piece 63, and the other end is contacted from the upper side with the other grounding connecting piece 63.

Figure 8:
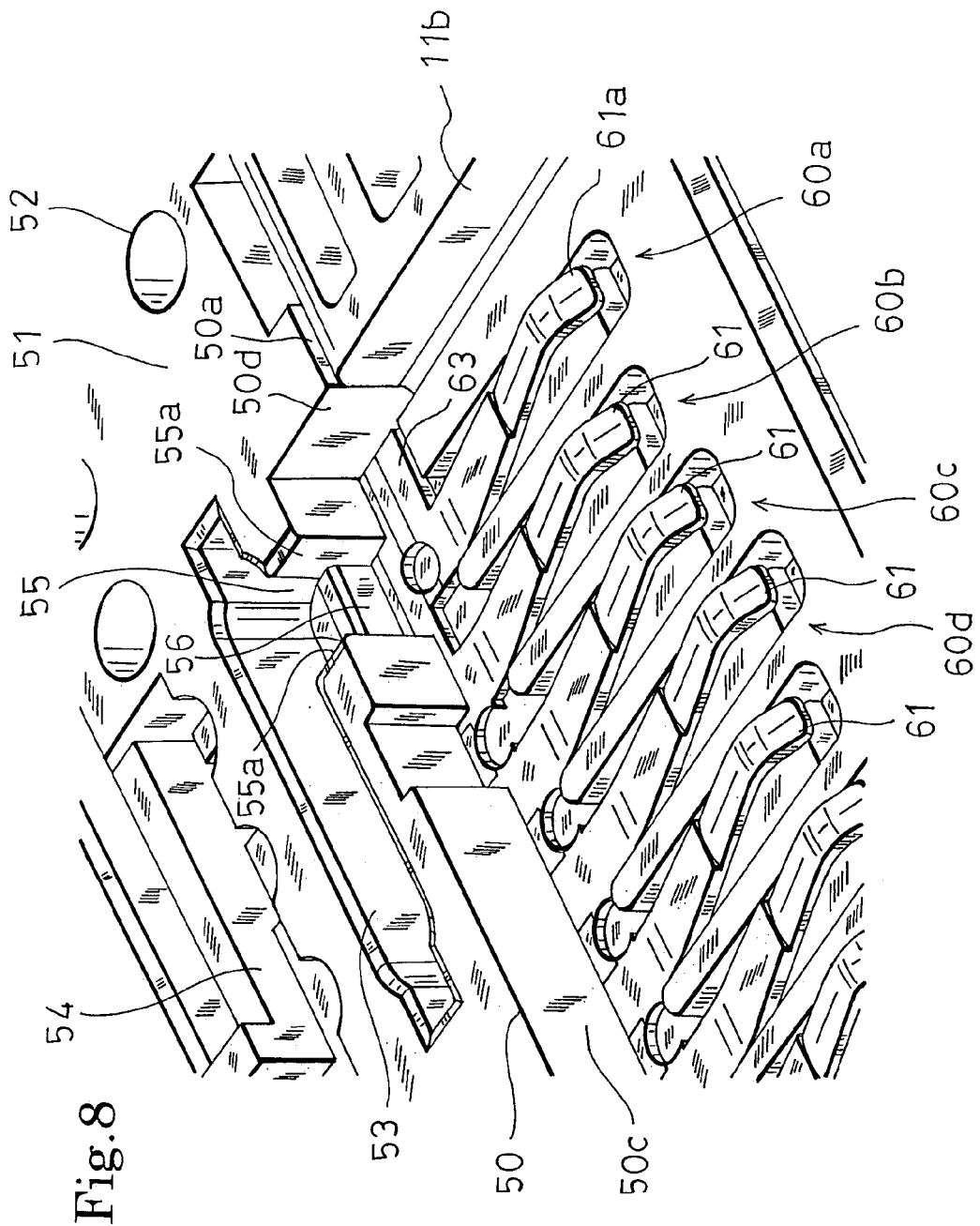
FIG. 8 is a view showing a contact spring piece portion of a different shape before a root part is pressed by a pressing member.

In the insulator 50, as shown in FIGS. 5 and 8, the peripheral side face of the elliptic tool insertion hole 53 is partly broken to form a cutaway portion 55 which is opened directly behind the contact spring piece portion 61a of the different shape, and a low-profile engaging piece 56 is standingly disposed between two cut-away end faces 55a which are opposed to each other across the cutaway portion 55.

The eight contacts 60a to 60h which are integrally coupled together are insert-molded to form the insulator 50. Thereafter, a punching process is applied on the semi-finished product of the electrical connection part 40, whereby the first joining piece 64 and second joining pieces 65 in the region of the insulator 50 are cut off through the circular tool insertion hole 52 and elliptic tool insertion hole 53 which are previously formed in the insulator 50. At the same time, also the remaining first joining pieces 64 outside the region of the insulator 50 are cut off to separate the eight contacts 60a to 60h which are integrally coupled together, and separate also the one grounding connecting piece 63 and two reserve connecting pieces 63 which are integrally coupled to the connecting piece 63 of the third contact 60c. Finally, coupling portions between the end contacts 60a for a command, 60h and the right and left connecting pieces 66 are cut off by a punching or bending process to be separated from the carrier 67, whereby a product of the electrical connection part 40 is completed as shown in FIGS. 5 and 6.

The pressing member 70 is made of a resin (insulative). As shown in FIGS. 3, 9, and 10, the pressing member is configured by: a long columnar plug portion 71 which is to be fitted into the elliptic tool insertion hole 53 of the insulator 50 that is formed for cutting off the second joining pieces 65; a hook-like connecting portion 72 which is protruded from the plug portion 71 into the cutaway portion 55 that is above the engaging piece 56, and which is vertically hung in front of the engaging piece 56; and a pressing portion 73 which is continuously integrally formed at the tip end of the connecting portion 72, and in which the lower face is flat. The pressing portion is to overlap with a range from the end portion of the connecting piece 63 on the side of the contact spring piece portion 61 of the first contact 60*a* which is protruded into the card attaching portion 11 from the partial side face 50*d* of the card attaching portion 11 formed by the insulator 50, to the rear end portion of the contact spring piece portion 61 of the first contact 60*a*, i.e., the root part of the contact spring piece portion 61 of the different shape.

The front side face of the connecting portion 72 is substantially flush with the rear end wall 50*c* of the card attaching portion 11 which is formed by the insulator 50, so as to constitute a part of the rear end wall 50*c*. The upper face of the pressing portion 73 is tapered so that the thickness is further reduced as more advancing toward the tip end, so that, when the micro SD card 300 is attached to the card attaching portion 11, the pressing portion is fitted into a chamfered region of the lower edge of the rear end portion of the micro SD card 300.

As shown in FIG. 3, the locking member 80 is formed by a plate spring of a thin metal plate which is folded back at a middle portion, and has a card engagement portion 81 on the tip end side of a movable spring piece which is on one side of the folded portion. Alternatively, the locking member 80 may be formed integrally with the base 10 by a resin.

The memory card adaptor 100 (adaptor body 1) of the embodiment is assembled by the thus configured components in the following manner. As shown in FIG. 3, first, the insulator 50 of the electrical connection part 40 is fitted from the upper side into the insulator housing portion 12 of the base 10. The eleven contact piece portions 62 which are flushly held in a juxtaposed state on the rear face of the insulator 50 are exposed through the contact exposing window 13 to the rear face of the rear end portion of the base 10, and the eight contact spring piece portions 61 which are inclinedly protruded in a juxtaposed state in a forward upward sloping manner in the front side of the insulator 50 are placed in a rear portion of the card attaching portion 11 of the base 10, to incorporate the electrical connection part 40 into the base 10.

As shown in FIGS. 3 and 9, next, the plug portion 71 of the pressing member 70 is fitted from the upper side into the elliptic tool insertion hole 53 of the insulator 50 which is formed for cutting off the second joining pieces 65. The pressing portion 73 which is integrally coupled with the plug portion 71 via the connecting portion 72 is superimposed on the root part of the contact spring piece portion 61 of the different shape. The root part of the contact spring piece portion 61 of the different shape is interposed between the pressing portion 73 and the bottom plate 10*a* of the base 10. In a state where the root part of the contact spring piece portion 61 of the different shape is pressed by the pressing portion 73, the pressing member 70 is incorporated into the base 10 by using the elliptic tool insertion hole 53 of the insulator 50. Alternatively, before the electrical connection part 40 is incorporated into the base 10, the pressing member 70 may be incorporated into the electrical connection part 40 by using the elliptic tool insertion hole 53 of the insulator 50, and then integrally incorporated together with the electrical connection part 40 into the base 10.

As shown in FIG. 3, the locking member 80 is incorporated into the locking member housing portion 15 of the base 10, the other side with respect to the folded portion of the locking member 80 is fixed, and the card engagement portion 81 which is formed on the tip end side of the movable spring piece that is on one side of the folded portion is protruded and held into the card attaching portion through the communication port 16 by the spring force of the movable spring piece.

As shown in FIGS. 1 and 2, next, the first engagement hooks 24 of the cover 20 are inserted from the upper side into the cover engagement grooves 10*e* of the base 10, and the second engagement hooks 25 of the cover 20 are inserted from the upper side into the other cover engagement grooves of the base 10 formed by gaps between the side wall 10*c* of the base 10 and the right and left side faces of the insulator 50. The cover 20 covers from the upper side the base 10 while the folded piece 26 and connecting terminal 27 of the cover 20 are fitted from the upper side into the terminal housing hole 54 of the insulator 50, so that the open upper faces of the right and left reinforcing ribs 10*b*, card attaching portion 11, and locking member housing portion 15 in the front wide portion of the base 10 are integrally covered by the main portion 21 of the cover 20. The second elongated portion 23 of the cover 20 is flushly superimposed on the upper face of the insulator 50, and the insulator 50 is interposed between the bottom plate 10*a* of the base 10 and the second elongated portion 23 of the cover 20. The pressing member 70 is interposed between the insulator 50 and the second elongated portion 23 of the cover 20, and the first elongated portions 22 of the cover 20 are superimposed on and cover the right and left outer side faces in the front wide portion of the base 10. The cover engagement hooks 10*d* of the base 10 are fitted into the base engagement holes 28 of the cover 20.

As shown in FIGS. 1 and 2, finally, the lower edges of the base engagement holes 28 of the first elongated portions 22 of the cover 20 are inward caulked to fittingly fix the cover 20 to the base 10 in the covered state, thereby completing the assembly.

In the assembly-completed state, as shown in FIGS. 1 and 2, the memory card adaptor 100 of the embodiment has the outer dimensions (the dimensions of the length, the width, and the thickness) which are identical with those of the mini SD card 200. In the same manner as the mini SD card 200, the eleven contact piece portions (terminals) 62 are exposed from the rear face of the rear end portion with being laterally juxtaposed, the cut-away portion 17 is formed in the rear side by cutting away one rear edge, the upward step portions 18 are disposed in the right and left side edges of the surface of the rear end portion in which the width is narrowed by the cut-away portion 17, and the locking cut-aways 19 are disposed on the right and left sides of the surface of the wide portion which is on the forward side with respect to the cut-away portion 17. Therefore, the adaptor can be attached to a card connector for the mini SD card 200.

A card insertion port 2 is opened in the front face, the card attaching portion 11 communicates with the card insertion port 2, and the eight cantilevered contact spring piece portions 61 are laterally juxtaposed in the rear portion (inner portion) of the card attaching portion 11. Therefore, the micro SD card 300 can be attached to the card attaching portion 11 through the card insertion port 2, and the free end portions of the eight contact spring piece portions 61 can be contacted with the eight terminals 303*a* to 303*h* of the attached micro SD card 300 to be electrically connected thereto.

The connecting terminal 27 which is formed integrally with the cover 20 is placed together with the folded piece 26 inside the terminal housing hole 54 of the insulator 50, and, by the elasticity of the terminal itself from the upper side, one end is pressed against and contacted with one grounding contact piece portion 62, and the other end is pressed against and contacted with the other grounding contact piece portion 62. As a result of the contacts, electrical connection is established between the two grounding contact piece portions 62 which are not adjacent to each other, and between the grounding contact piece portions 62 and the cover 20. The joining faces between the base 10 and the main portion 21 and first elongated portions 22 of the cover 20, and the joining face of the insulator 50 with the second elongated portion 23 of the cover 20 are recessed from their outer peripheries by a degree corresponding to the thickness of the cover 20, so that the surfaces of the main portion 21 and first elongated portions 22 of the cover 20 are flush with the surface of the base 10 surrounding them, and the surface of the second elongated portion 23 of the cover 20 is flush with the surface of the insulator 50 surrounding it.

In the contact spring piece portion 61 of the different shape, as shown in FIGS. 3 and 9, the root part is pressed firmly and surely by the pressing portion 73 of the pressing member 70 which is fixed by fitting the plug portion 71 into the elliptic tool insertion hole 53 of the insulator 50 which is formed for cutting off the second joining pieces 65, to be interposed between the insulator 50 and the cover 20. The elliptic tool insertion hole 53 of the insulator 50 is closed by fitting the plug portion 71 of the pressing member 70. Therefore, it is possible to prevent conductive foreign materials such as dusts which may cause short circuit, from entering the tool insertion hole 53.

The micro SD card 300 is attached to the thus assembled memory card adaptor 100 in the following manner. As shown in FIG. 1, the micro SD card 300 in the normal insertion posture in which the longitudinal and front/back directions are oriented to the normal directions is inserted into the card attaching portion 11 through the card insertion port 2. The micro SD card 300 is inserted to an inner area of the card attaching portion 11 while the side portion where the locking cut-away 302 is disposed pushes back the card engagement portion 81 of the locking member 80 against the spring force of the movable spring piece. The eight terminals 303*a* to 303*h* which are disposed on the rear face of the rear end portion of the micro SD card 300 are elastically contacted with the free end portions of the eight contact spring piece portions 61 which are juxtaposed in the rear portion of the card attaching portion 11, to be electrically connected thereto. Since the root part of the contact spring piece portion 61 of the different shape is pressed firmly and surely by the pressing portion 73 of the pressing member 70, a force acting in a direction along which the root part is twisted is not produced, and the strength and spring force of the contact spring piece portion are substantially identical with those of the other the contact spring piece portions 61. Therefore, even the contact spring piece portion 61*a* of the different shape can maintain stable contact with the terminals of the micro SD card 300. When the micro SD card 300 is further inserted into the card attaching portion 11, the rear end portion of the micro SD card 300 bumps against the rear end wall 50*c* of the card attaching portion 11 which is formed by the insulator 50, thereby restricting further insertion. The card engagement portion 81 of the locking member 80 is opposed to the locking cut-away 302 of the micro SD card 300, and engaged with the locking cut-away 302 by the spring force of the movable spring piece, thereby preventing the micro SD card 300 from dropping off.

When the micro SD card 300 attached to the memory card adaptor 100 is to be extracted, the front-end portion of the micro SD card 300 is nipped, and the micro SD card 300 is forward extracted against the spring force of the movable spring piece of the locking member 80. Then, the engagement state between the locking cut-away 302 of the micro SD card 300 and the card engagement portion 81 of the locking member 80 is canceled, and the micro SD card 300 can be extracted from the memory card adaptor 100.

In the micro SD card 300 attached to the memory card adaptor 100, the eight terminals 303*a* to 303*h* are electrically connected to the corresponding eight contacts 60*a* to 60*h*. When the memory card adaptor 100 is attached in the normal insertion posture to a card connector for the mini SD card 200, therefore, the eight terminals 303*a* to 303*h* of the micro SD card 300 are electrically connected to corresponding contacts of the card connector for the mini SD card 200 through the corresponding eight contacts 60*a* to 60*h* of the memory card adaptor 100. In the same manner as the mini SD card 200, as a result, the micro SD card 300 is enabled to be used in the card connector for the mini SD card 200.

The thickness of the mini SD card 200 is not largely different from that of the micro SD card 300. Therefore, one of the components constituting the adaptor body 1, i.e., the base 10 is formed as a resin molded product (insulative), and the other component, or the cover 20 is formed by punching and bending a metal plate. A principal surface portion of the metal-made cover 20 which constitutes one principal face (surface) of the adaptor body 1 is thinned as far as possible while ensuring sufficient rigidity, and a principal surface portion of the resin-made base 10 which constitutes the other principal face (rear face) of the adaptor body 1 is thickened as far as possible to ensure sufficient rigidity, whereby the rigidity of the whole adaptor body 1 can be enhanced.

The connecting terminal 27 for electrically connecting (short circuiting) between the two grounding contact piece portions 62 which are not adjacent to each other is integrally formed on the metal-made (conductive) cover 20 which constitute the surface of the adaptor body 1. Therefore, the number of components can be reduced, the assembling process can be facilitated, and the production cost can be lowered. Furthermore, the cover 20 and the grounding contact piece portions 62 are electrical connected with each other through the connecting terminal 27, and therefore also a countermeasure against electrostatic breakdown is simultaneously realized.

The cover 20 is fixed to the base 10 by caulking a part of the cover. Therefore, the base 10, the cover 20, and the electrical connection part 40 which is an interior component can be firmly coupled and integrated in a reduced space.

In the above embodiment, an example of the preferred embodiment of the invention has been described. The invention is not restricted to it, and may be variously modified without departing from the spirit of the invention. For example, the invention can be preferably applied also to memory card adaptors of other kinds except a memory card adaptor which enables the micro SD card 300 to be used in a card connector for the mini SD card 200.

What is claimed is:

1. A memory card adaptor comprising: an adaptor body which is configured by a base, and a cover covering said base, and in which a card insertion port into which a small memory card is to be inserted is disposed in a front side face, a card attaching portion which communicates with said card insertion port, and to which a small memory card is to be attached is disposed in an inner front portion, and outer dimensions are identical with outer dimensions of a large memory card that is larger than the small memory card; and an electrical connection part between the small memory card and a card connector for the large memory card, said electrical connection part being a composite part configured by an insulative member and plural conductive members, and formed by insert molding, said insulative member being housed in an inner rear portion of said adaptor body, cantilevered front end portions of said conductive members being protruded from said insulative member into said card attaching portion, and forming contact spring piece portions which are to be elastically contacted with terminals of the small memory card attached to said card attaching portion, rear end portions of said conductive members being exposed from a rear face side of a rear end portion of said adaptor body, and forming contact piece portions with which terminals of the card connector for the large memory card are to be elastically contacted, at least one of said contact spring piece portions being formed into a different shape not by a front end portion of a conductive member protruded from said insulative member into said card attaching portion of said adaptor body in a straight manner in a plan view, but by a front end portion of a conductive member protruded in an L-like shape, wherein said memory card adaptor further comprises a resin-made pressing member which interposes a root part of said contact spring piece portion of the different shape between said pressing member and said adaptor body.

2. A memory card adaptor according to claim 1, wherein a plug portion which is fitted into a tool insertion hole is disposed integrally in said the pressing member, said tool insertion hole being formed in said insulative member when insert molding is performed on said insulative member and said plural conductive members in a state where said conductive members are integrally coupled to a hoop material, and being used for, after the insert molding, cutting off unwanted coupling portions of plural conductive members in an integrally coupled state.

* * * * *